United States Patent [19]

Upatnieks

[11] 4,012,150
[45] Mar. 15, 1977

[54] HOLOGRAPHIC LIGHT LINE SIGHT

[75] Inventor: Juris Upatnieks, Ann Arbor, Mich.

[73] Assignee: Environmental Research Institute of Michigan, Ann Arbor, Mich.

[22] Filed: Aug. 18, 1975

[21] Appl. No.: 605,404

[52] U.S. Cl. .............................. 356/247; 33/241; 350/3.5; 350/10
[51] Int. Cl.² ........................................ G02B 27/34
[58] Field of Search ............. 356/247; 350/3.5, 10; 33/233, 241, 247

[56] References Cited

UNITED STATES PATENTS

| | | | |
|---|---|---|---|
| 3,536,378 | 10/1970 | Bishop | 350/188 X |
| 3,633,988 | 1/1972 | Farrar | 350/3.5 |
| 3,833,300 | 9/1974 | Rymes | 356/247 X |

*Primary Examiner*—John K. Corbin
*Assistant Examiner*—Matthew W. Koren
*Attorney, Agent, or Firm*—Krass & Young

[57] ABSTRACT

A sight for determining the direction and distance from a viewer to a target employs a transparent panel containing a hologram of a line of light on a plain background. The line extends from one side of the field of view, near the viewer, away from the hologram, and terminates at its far end in the central portion of the field of view. A coherent light source illuminates the panel to reconstruct a three-dimensional virtual image of the line superimposed on the scene viewed through the hologram. By moving the panel and source relative to the viewer the line may be moved and by adjusting the angle of incidence of the reconstructing wavefront and the position of their source relative to the panel, the extension of the line from the viewer may be manipulated.

In alternative embodiments a reticle or distance and direction indicia are formed along the line; a plurality of different lines are recorded on the hologram using reference beams bearing different angles to the recording plate so as to be selectively reconstructable; and the panel is associated with an artillery piece and the line is curved to approximate the trajectory of a projectile.

10 Claims, 9 Drawing Figures

HOLOGRAPHIC LIGHT LINE SIGHT

BACKGROUND OF THE INVENTION

1. Field of the Invention

This invention relates to range finders and sights for determining the direction and distance from a viewer to a distant object for use with guns and the like, and more particularly to a sight employing a hologram and means for reconstructing a three-dimensional light line from the hologram so that it is superimposed on a scene viewed through the hologram, to provide information relative to the distance and direction from the viewer, of objects in the scene.

2. Prior Art

Conventional sights for aiming guns, surveying instruments and the like, or range finders for determining the distance from the observer to the object, typically impose close limitations on the position of the viewer's eye relative to the sight. Hairline sights as used on rifles depend for their accuracy on the exact alignment of the observer's eye with the two sight elements. Telescopic sights typically restrict the observer's eye to within an inch or so. Both of these forms of sights severely restrict the field of view about the target making it difficult to locate a target within the sight. Both of these limitations render it difficult to use the sights on moving vehicles or in other situations where the observer is subjected to vibration and impacts.

U.S. Pat. No. 3,633,988 proposes a form of sight which overcomes these limitations by employing a hologram interposed between the observer and the target. The image of a point located at infinity may be reconstructed from the hologram so that the observer views the target object with the image of the point superimposed. By manipulating the hologram and its coherent source to align the point with the target object, the direction to the target may be ascertained. The observer's eye may be moved through the relatively large area which will allow him to observe both the reconstructed point and the target through the hologram plate and the observer's field of view of the target is not in any way artificially restricted.

U.S. Pat. No. 3,737,212 discloses a similar structure employing a hologram which is capable of projecting the image of a point or a reticle on a target viewed through the hologram. Despite these advantages such sights have not gained widespread use because of the necessary compromise that they impose between viewing ease and precision. If the projected point is made large enough for easy viewing it inherently blocks the view of the target and limits the precision with which the point can be aligned on the target. If the point is made smaller, easing these limitations, it becomes difficult to locate on the scene.

While the images of points that are used for aiming with these holographic sights theoretically may be viewed in three dimensions, as a practical matter, their three-dimensional nature is not meaningful since they appear at infinity and any movement of the observer's head relative to the hologram produces very little movement of the point relative to the observed scene.

SUMMARY OF THE INVENTION

The present invention is directed toward a sight employing a hologram, and enjoying its attendant advantages relative to the position of the observer's head and the field of view, which overcomes the difficulties associated with the use of a point at infinity as an aiming device and additionally acts as a range finder. Broadly, the present invention employs a hologram which records the image of a line of light extending away from the hologram and having its far end terminating in the central area of the field of view of the hologram. The reconstructed three-dimensional image of this line may be superimposed on a scene viewed through the hologram and appears as a line extending away from the viewer. It may be straight or the line may be curved to approximate the trajectory of a projectile shot from a gun associated with the viewer. The line may be continuous or it may be interrupted but it must be sufficiently continuous to lead the viewer's eye along the line so that he may visually gauge the coincidence of either the end of the line, or a point along the line, with a target.

The scene observed by the viewer, with the superimposed light line, looks as if a laser beam were propogated from the observer through somewhat dusty air. A bright line is seen to extend from the laser into the distance. The line can be pointed in any direction by moving the plate and the reconstructing source and can be extended or contracted by varying the relative position of the viewing plate and the reconstructing source.

From the standpoint of protecting the observer from detection it is important to note that no light is propogated along direction of the light line. That is, the light line is not visible from the direction of the target. Light from the viewing panel propogates only in the direction of the observer.

The accuracy of sight alignment is independent of the observer's position relative to the plate since there is no parallax between the far end of the line and distant objects. This feature, coupled with the wide angle of view through the panel allows a number of observers to simultaneously view light line and target area. For greater accuracy, the light line and the scene may be observed through the hologram plate with binoculars or a telescope.

The provision of a line rather than a point allows the viewer to utilize the three-dimensional nature of the display to determine coincidence of points along the line and particularly the line end with a target point in three dimensions. By viewing the coincidence of a line point and the target point from different points within the field of view, that positional relationship is verified.

The line must be thin at its end point to allow accurate alignment with the target but may have greater width at points nearer to the observer.

In prior art devices which used a hologram to project a point at infinity, it was not possible to gauge distances from the observer. Using the present invention, which effectively generates the series of points having progressive departure from the observer, it is possible to gauge distances of points in a scene on the basis of the point at which they intersect the projected line. This measurement may be aided by indicia spaced along the line and indicating distances from the hologram. Other indicia such as a reticle or elevation or azimuth markings may also be superimposed on the display.

The present invention further contemplates an adjustable feature wherein the source of the reconstructing coherent wavefronts, and their angle of incidence with the hologram may be modified to extend or retract the virtual image of the line in space with respect to the hologram. The adjustment mechanism may be coordinated with suitable indicia which allow control of the distance of the end point of the line from the hologram.

An alternative embodiment of the present invention, which will be subsequently disclosed in detail, employs a hologram which records a number of light lines, each made with a reference beam bearing a different angle with respect to the photographic plate so that they may be selectively reconstructed by controlling the angle of the reconstructing beam relative to the hologram. In the subsequently disclosed embodiment, this method is used to record lines representative of trajectories of projectiles fired from a single gun with different barrel elevations. This arrangement may be used to select an appropriate barrel elevation and to provide a distance graduated light line which coincides with the projectile trajectory so that the distance of explosion of the shell may be gauged.

The devices of the present invention are particularly useful as gun sights for automatic or remotely controlled weapons. They are additionally useful for triangulation of gun flashes and the like, especially under poor conditions of visibility, such as night, in haze or fog.

The present invention further relates to methods of forming the holograms incorporating the light lines.

These methods include projecting a line onto a flat or curved surface that scatters light by means of appropriate optical elements; recording the light scattered from one side of a flat or curved transparent surface which is illuminated from the other side; by illuminating the edge of a thin sheet material so that only the light scattered off this edge is recorded on a hologram; and by coupling light into a thin transparent material such as a sheet of plexiglass so that the light remains confined to the sheet by internal reflection. A bright line can be formed by scratching the surface so that the line light is scattered by the scratch.

The recorded hologram may be a magnified version of the actual line of sight.

Other objectives, advantages and applications of the present invention will be made apparent by the following detailed description of several preferred embodiments of the invention. The description makes reference to the accompanying drawings in which.

Figure 1:
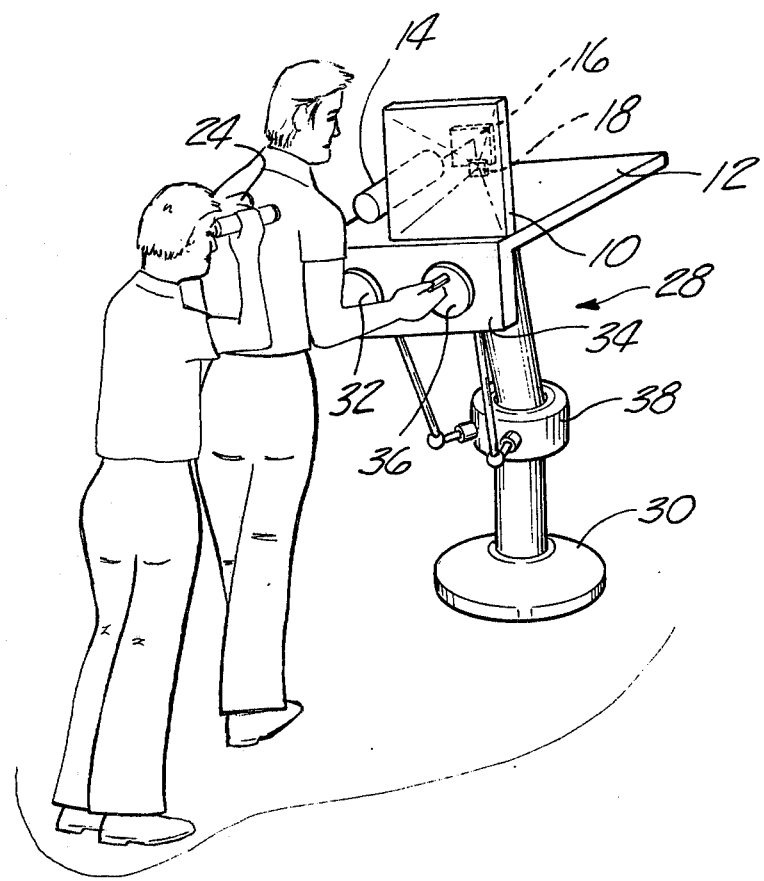
FIG. 1 is a perspective view of a first embodiment of my invention constituting a holographic sight adjustable in both elevation and azimuth, illustrating a pair of observers using the sight.

Referring to FIG. 1, all of the sight/range finders formed in accordance with the present invention employ a plate or panel 10 which may be formed of glass, plastic or other transparent material. The size of the plate 10 may vary with particular applications and for a preferred embodiment has a height of 10 inches and a width of 12 inches. The plate appears substantially transparent to the observer but has fine fringe lines imprinted on its surface which represent the holographic record of a line of light. This record is formed in a manner which will subsequently be described.

The plate 10 is supported on a base 12 along a laser 14. The laser may be a low powered helium-neon device. Its output is reflected by a mirror 16 to a positive lens 18 which causes the beam to diverge. The diverging beam illustrates one side of the plate 10 at the same angle as with wavefronts of the same curvature as the reference beam used to form the holographic record on the plate.

Figure 2:
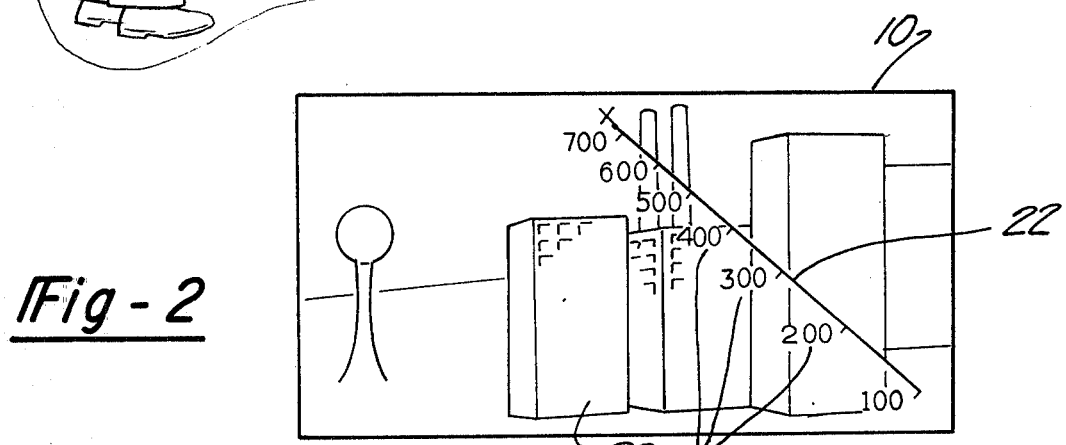
FIG. 2 illustrates a scene viewed through the device of FIG. 1, with the light line superimposed on the scene.

FIG. 2 illustrates a scene 20 as observed by a viewer looking through a plate 10 from the side opposite to that which is illuminated. Since the plate is substantially transparent, the background scene 20 may be viewed through the plate. The observer will also see the virtual image of a light line 22 which appears to originate from a point near the observer, to one side of the plate, and to extend away from the plate 10 with its far end terminating somewhere in the central portion of the field of view. The virtual image of the line 22 has all of the attributes of a three-dimensional line and the relationship between points on the line and the scene 22 may be viewed from different angles by looking through different areas of the panel 10; however, there is no parallax if the line and image are at the same distance and the two observers illustrated in FIG. 1 will view the scene and the light line as having the same three-dimensional relationship. By use of binoculars 24, or other magnifying devices, the resolution of the line and the scene may be improved.

The image of the light line 22 has distance markings 26 superimposed at regular intervals so that an observer can make a range determination based upon the proximity or intersection of particular points on the line and objects in the scene.

In order to generate elevation and azimuth readings the table 12 is fixed to a support 28 which may be adjusted to adjust the apparent position of the line 22 upon the scene 20. The table 12 may be rotated about a vertical axis by means of a rotary mount 30 controlled by a manually adjustable control member 32 supported on a panel 34. Similarly, the inclination of the table, in a plane transverse to the plane of the panel 10, may be controlled by a manual adjustment mechanism 36 which controls a pivoting joint 38. The elevation and azimuth controls 32 and 36 may have suitable indicia so that numerical values may be assigned to inclination and azimuth.

Figure 3:
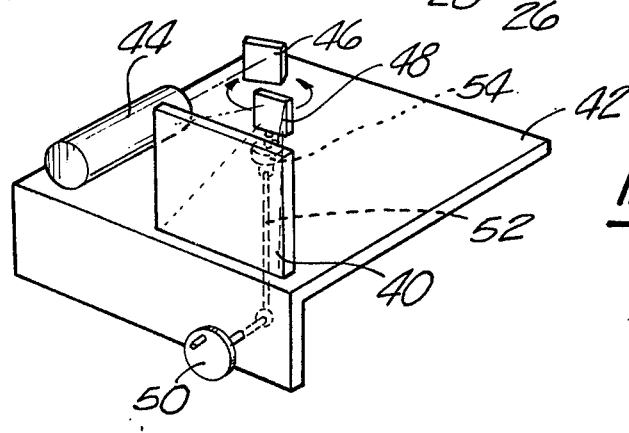
FIG. 3 illustrates an alternative embodiment of my invention wherein the relative position of the hologram and the reconstructing light source are adjustable to allow control of the apparent extension of the reconstructed light line with respect to the observer.

An alternative embodiment of the invention is illustrated in FIG. 3 wherein a light line can effectively be magnified so as to modify the length of the line or its extension from the observer. A transparent plate 40 containing a holographic recording of the light line, either alone or with suitable indicia, is supported on a base 42. A laser 44, supported on the base 42, projects its beam at a mirror 46 which reflects it to an objective lens 48. The lens is supported so that its position on the base 42 may be adjusted along the axis of the beam reflected by the mirror 46. This adjustment is achieved by a hand wheel 50 which rotates a lead screw 52 to move a nut 54 that supports the lens 48. By adjusting the distance between the lens 48 and the plate 40 the divergence of the reconstructing light wavefronts at the hologram is controlled. The adjustment device 50 may be calibrated so that any particular position is marked with the corresponding range to the end of the line or the magnification of distance indicia associated with the line display from base values.

While these adjustments and the magnification of the line produce some aberrations in the reconstructed image of the line these aberrations are generally unimportant, except insofar as they blur the image of the end of the line. To the extent that these aberrations are objectionable, either the reference beam used during recording of the hologram or the illuminating beam may be appropriately distorted by conventional optics to remove them.

An observer looking through the panel 40 can control the apparent position of the end of the line or the length of the line. He can thus use the device as a range finder by bringing the end of the line into coincidence with a particular point in the scene being observed through the hologram and determining the amplification required to achieve this relationship.

Figure 4:
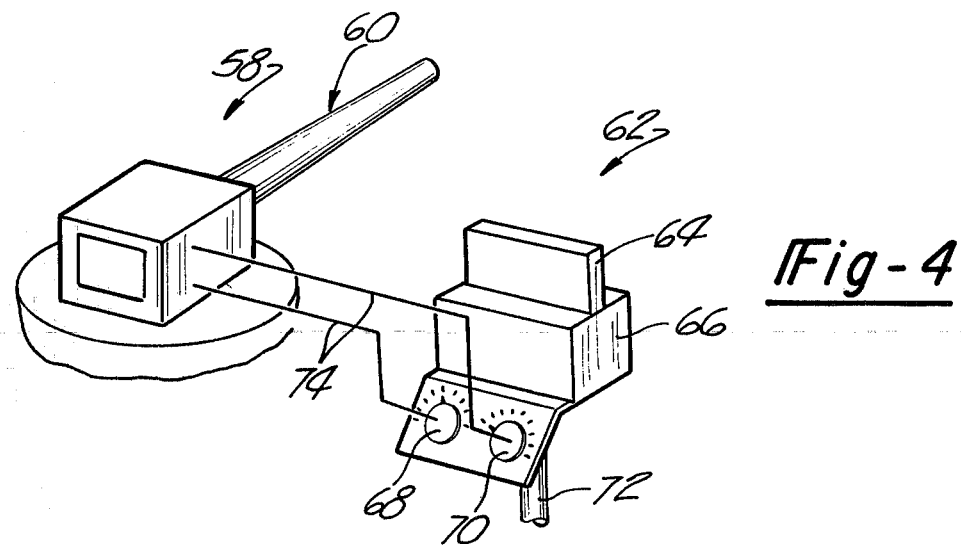
FIG. 4 illustrates an embodiment of my invention connected to an artillary piece so as to control its elevation and azimuth.

The devices of the present invention can be used to control associated devices such as vehicles, ships or guns. FIG. 4 illustrates an embodiment of the invention used to control the inclination and azimuth of an artillary piece 58 having a barrel 60. The viewing device, generally illustrated at 62, includes a transparent plate 64 incorporating the hologram of a light line supported on a base 66 which also encloses a coherent light source and associated optics for generating a reconstructing beam for the hologram 64. A pair of dials 68 and 70 control the elevation and azimuth of the plate 64 relative to a base 72. A suitable electronic control system, driven by the indicators 68 and 70 and connected to the gun by lines 74, controls the elevation and azimuth of the artillary piece 58.

An observer, looking through the hologram 64, adjusts the controls 68 and 70 to bring the end of the light line visible in the plate 64 into coincidence with a target in the background scene. The adjustments of the controls also vary the position of the gun barrel 60 so the projectile shot by the gun will impact the target. The light line may be curved to represent the trajectory of the projectile shot by the barrel 60, in a manner which will be described in connection with the description of FIG. 6.

Figure 5:
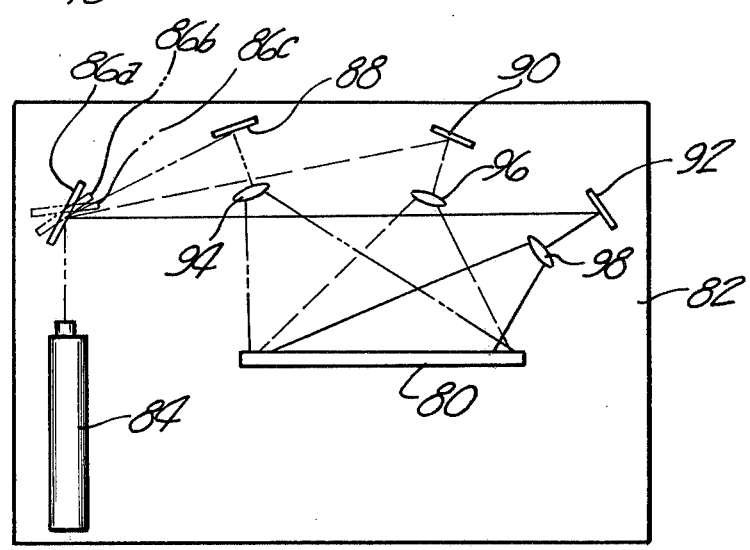
FIG. 5 is a plan view of another embodiment of my invention wherein a plurality of different light lines are recorded in a single hologram view and are selectively displayable.

A plurality of light lines, either alone or in combination with suitable indicia, may be recorded on a single panel and may be selectively displayed. The selection may be based on the correspondence between the angle of the reference beam during recording and the angle of the reconstructing beam during subsequent illumination, by use of laser beams of different wave lengths, or by other known methods. In the embodiment illustrated in FIG. 5 a transparent hologram plate 80 has three separate light lines recorded thereon employing reference beams which bear a different angle to the recording plate for each line. The plate is supported normally to a base 82 which also supports a laser 84. The laser beam projects to a mirror 86 which is adjustable to one of three angles indicated at 86a, 86b and 86c. Three mirrors 88, 90 and 92 are supported on the base 82 but the laser beam is reflected to one of these three mirrors depending upon the position of the mirror 86. Three lenses 94, 96 and 98 are supported on the base 82. When the mirror 86 is positioned to reflect the laser beam to mirror 88 that mirror reflects the beam through the positive lens 94 to illuminate the hologram plate 80 from a first angle. When the mirror 86 is in its b position so as to reflect light to the mirror 90, that mirror reflects the beam to the positive lens 96 to illuminate the hologram plate 80 from the second position; when the mirror 86 is in its third position the hologram 80 is illuminated through lens 98.

Figure 6:
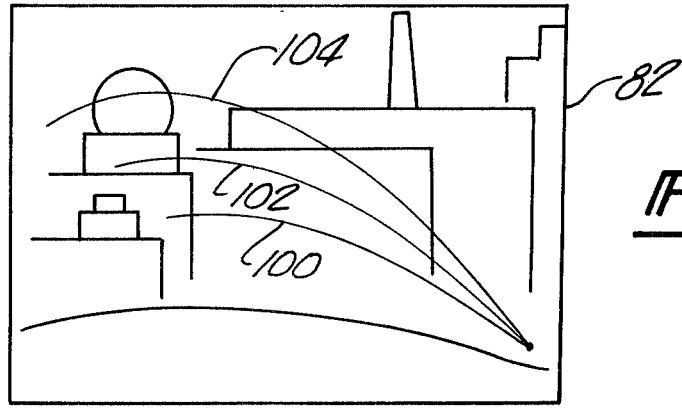
FIG. 6 illustrates a scene observed through the viewer of FIG. 5, with alternately selectable light lines illustrated.

FIG. 6 illustrates the three light lines 100, 102 and 104 which may be reconstructed from the plate 82. Each of the lines is dashed and each is curved to represent the trajectory of projectiles fired by an associated weapon for a particular angle of barrel inclination. The position of the mirror 86 may be adjusted by the observer to determine the correct elevation for the weapon barrel.

Figure 7:
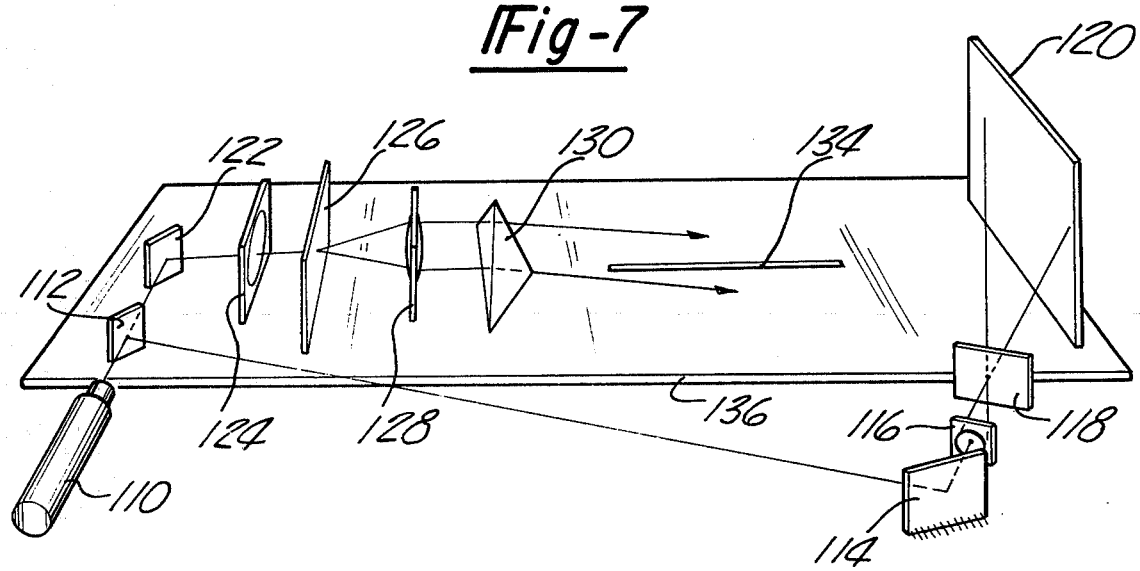
FIG. 7 is a perspective view of apparatus for forming the holographic plate used with the present invention.
Figure 8:
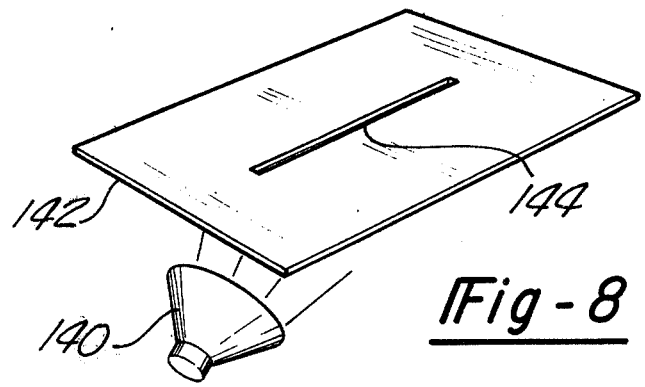
FIG. 8 is a perspective view of an alternative method of constructing the plates of the present invention.
Figure 9:
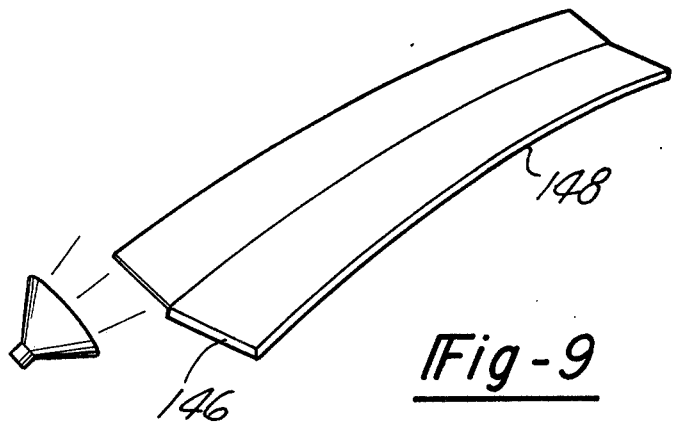
FIG. 9 is a perspective view of a third alternative method for constructing the holographic plates of the present invention.

The viewing plate containing the light line holograms, such as those indicated by the numerals 10, 40, 64 and 80 of the above-described embodiments of the invention can be generated using one of several techniques illustrated in FIGS. 7–9. With the apparatus illustrated in FIG. 7, the line is projected onto a surface that scatters light. The light is derived from a laser 110 which projects its beam onto a half silvered mirror or beam splitter 112. One half of the divided beam is projected by a mirror 114 through a positive lens 116 and a pin hole 118 to project a clean reference beam on a photographic plate 120. The other half of the beam passed by the splitter 112 is reflected by a mirror 122 through a positive lens 124 and a pinhole 126. A second positive lens 128 collimates the beam and passes it to a cylindrical-conical lens 130 which projects an elongated line of light 134 on a diffusely reflective base 136. The photographic plate 120 is positioned to receive the diffuse reflection of the light line 134. It therefore records a hologram of that light line on an otherwise featureless background.

Alternatively, magnifying optics could be placed between the diffuse light line 134 and the photographic plate 120, to form a hologram of a magnified light line. By this technique, a light line of the few inches of length on the base 136 could be used to create the hologram of a light line having the apparent extension of hundreds of feet. The conventional light line recorded on the plate 120 could also be reconstructed and recorded on a second hologram so as to provide a magnified image of the line. The surface 136 could be curved so as to provide a curved light line of the type illustrated in FIG. 6.

FIG. 8 illustrates a line of light formed by projecting light from a laser light source 140 to the underside of an opaque place 142 having an elongated transparent section 144. The transparent section could be formed by coating the transparent place with opaque paint and then removing this masking along the line of desired configuration. A hologram can be formed of this light line using conventional apparatus of the type shown in FIG. 7.

FIG. 9 discloses an alternative method of forming the light line which uses a sheet 146 of transparent acrylic plastic or the like which transmits the light by internal reflection. A hologram may then be formed of an edge 148 of the sheet which may be straight or appropriately curved. The edge may be masked at points to produce a dotted line of the type illustrated in FIG. 6. Alternatly, the edge may be illuminated directly by a laser beam.

Having thus described my invention, I claim:

1. A sight of the type described comprising: a substantially transparent plate having formed thereon a hologram recording a single line of light on an otherwise substantially blank surface, the recorded light line having one end proximite the hologram and the other end relatively distant from the hologram and terminating at a point within the field of view of the major portion of the hologram; a coherent light source; optical means for illuminating the hologram with the light source to reconstruct a virtual image of the light line so that an observer viewing a scene through the illuminated hologram may observe the super-position of the light line with the scene.

2. The sight of claim 1 including means for supporting the plate, the coherent light source and the optical elements relative to one another and means for adjusting the three relative to one another so as to vary the apparent projection of the reconstructed virtual image of the light line relative to the scene observed through the hologram.

3. A sight, comprising: a substantially transparent rigid plate constituting a hologram of a single line of light on a uniform, substantially unilluminated background, the light line having an end proximate the hologram at one edge of the field of view of the hologram, and its other end relatively distant from the hologram and terminating at a point within the central portion of the field of view of the hologram; means for supporting the plate in the line of view of an observer relative to a scene; and means for illuminating the hologram from the side opposite the observer with coherent light wavefronts so as to reconstruct the image of the light line in three-dimensional super-position on the scene.

4. The sight of claim 3 including means for varying the position of the source of coherent light relative to the plate to modify the point of termination of the far end of the reconstructed light line relative to the scene.

5. The sight of claim 3 wherein the light line is continuous.

6. The sight of claim 3 wherein the light line is formed of a plurality of unconnected light segments arrayed along the line.

7. The sight of claim 3 wherein the hologram recorded on the plate further includes a plurality of indicia formed at regular spaced intervals along projection of the line and/or at the end of the line.

8. The sight of claim 3 further including indicia formed on the hologram so as to be superimposed on the scene observed by the viewer and indicate distances of points along the light line.

9. The sight of claim 3 further including a ballistic projector supported in fixed position relative to the sight and operative to project a ballistic device along a curved trajectory; and wherein the light line formed on the plate is curved similarly to the trajectory of the projectile.

10. The sight of claim 9 including means for moving the ballistic projector into position relative to the plate so that the trajectory of a projectile from the projector coincides with the virtual position of the light line as superimposed on the scene.

* * * * *